United States Patent [19]
Gardner et al.

[11] Patent Number: 5,950,120
[45] Date of Patent: Sep. 7, 1999

[54] APPARATUS AND METHOD FOR SHUTDOWN OF WIRELESS COMMUNICATIONS MOBILE STATION WITH MULTIPLE CLOCKS

[75] Inventors: William R. Gardner; Linley M. Young, both of San Diego; Peter P. White, Encinitas, all of Calif.

[73] Assignee: LSI Logic Corporation, Milpitas, Calif.

[21] Appl. No.: 08/877,215

[22] Filed: Jun. 17, 1997

[51] Int. Cl.[6] .............................. H04Q 7/20; H04B 1/16; H04B 1/38
[52] U.S. Cl. ......................... 455/343; 455/574; 455/403
[58] Field of Search ..................................... 455/343, 574, 455/115, 403, 110, 116, 109, 38.3; 375/316, 376

[56] References Cited

U.S. PATENT DOCUMENTS

| | | |
|---|---|---|
| 4,209,786 | 6/1980 | Barley et al. . |
| 4,331,941 | 5/1982 | Kovalick et al. . |
| 5,101,506 | 3/1992 | Walls . |
| 5,142,699 | 8/1992 | Sato et al. ............................. 455/343 |
| 5,283,568 | 2/1994 | Asai et al. ............................ 455/343 |
| 5,737,323 | 4/1998 | Lansdowne ........................... 455/343 |

*Primary Examiner*—Dwayne D. Bost
*Assistant Examiner*—Tracy M. Legree
*Attorney, Agent, or Firm*—Mitchell, Silberberg & Knupp LLP

[57] ABSTRACT

The present invention presents a mobile station of a wireless communications system such that when the mobile station is in idle mode (i.e., listening to a paging channel periodically, but otherwise taking no action), the control processor commands the mobile station to enter into sleep mode to minimize power consumption. During sleep mode, the high-frequency reference clock and thus all high-frequency clocks derived from it are turned off. Only a low-frequency clock remains operating at all times to clock the sleep logic.

5 Claims, 5 Drawing Sheets

FIG. 3 *PRIOR ART*

APPARATUS AND METHOD FOR SHUTDOWN OF WIRELESS COMMUNICATIONS MOBILE STATION WITH MULTIPLE CLOCKS

BACKGROUND OF THE INVENTION

1. Field of the Invention

The present invention generally relates to the art of wireless communications system. In particular, the present invention relates to the art of minimizing power consumption in mobile stations.

2. Description of Related Art

A. Basic GSM System Architecture.

As reflected in FIG. 1, a GSM cellular network is comprised of three fundamental parts:

(1) a mobile station 1 (which is carried by the subscriber);

(2) a base station subsystem 2 (which controls the radio link with the mobile station); and (3) a network subsystem 3 (which is interfaced to the public fixed network 4 and the base station subsystem). The network subsystem and the base station subsystem communicate across the "A" interface 5, while the mobile station and the base station subsystem communicate across the air interface or radio link (also called the "Um" interface) 6.

It should be noted, however, that application of the present invention is not necessarily limited to use within a GSM system, but can also be applied to the mobile stations of other wireless communication systems, such as CDMA systems.

Mobile Station. The mobile station is the "phone" part of the wireless communication system. The mobile station may be fixed or portable. Fixed mobile stations are permanently installed in a car or a stationary location. Portable units include bag phones and hand-portable phones (commonly called "cell phones"). Hand-portable phones are becoming increasingly popular because they can be carried easily on the person of the subscriber. A mobile station includes an antenna 7 for transmitting and receiving radio signals from the base station subsystem.

Base Station Subsystem. The base station subsystem comprises two fundamental elements, (1) one or more base transceiver stations (8 and 9) and (2) a base station controller 10. These components communicate across the Abis interface 11. A base transceiver station includes radio transceivers that handle radio-link protocols with the mobile station and an antenna 12 for communication with mobile stations.

The base station controller manages the radio resources of the base transceiver stations. It also manages handovers (passing the audio from cell to cell during a call), frequency hopping (changing operating frequency to maintain signal quality) and radio-channel setup.

Network Subsystem. The basic element of the network subsystem is the mobile services switching center (MSC) 13. The MSC is the interface of the cellular network to the public fixed network and, as such, basically performs the functions of a switching node of the public fixed network. The MSC also routes calls from the public fixed network (via the base station controller and the base transceiver station) to the mobile station. The MSC also provides the GSM system with individual information about the various mobile stations and performs the functions of authentication, location updating, and registration. The MSC may operate in conjunction with other functional entities which further comprise a network subsystem, such as registers which hold information regarding current mobile station location and subscriber information.

B. Air Interface or Um Interface.

In conventional wireless communications technology, user data (e.g. speech) is encoded in a radio frequency for transmission and reception between a base station and a mobile unit. Because the number of available radio frequencies, or "channels," for cellular system is less than the number of all possible users, the system is "trunked." Trunking is the process whereby users share a limited number of channels in some predetermined manner.

A common form of trunked access is the frequency-division multiple access (FDMA) system. In FDMA, the limited channels are shared by all users as needed. However, once a channel is assigned to a user, the channel is used exclusively by the user until the user no longer needs the channel. This limits the number of concurrent users of each channel to one, and the total number of users of the entire system, at any instant, to the number of available channels.

Another common trunking system is the time-division multiple access (TDMA) system. TDMA is commonly used in telephone networks, especially in cellular telephone systems, in combination with an FDMA structure. In TDMA, data (speech) is digitized and compressed to eliminate redundancy and silent periods, thus decreasing the amount of data which is required to be transmitted and received for the same amount of information. Each of the channels used by the TDMA system is divided into "frames" and each of the users sharing the common channel is assigned a time slot within the frames. The TDMA system appears, to each of the users sharing the channel, to have provided an entire channel to each user.

A FDMA and TDMA combination technique is used by the GSM system. In GSM, each channel is divided up in time into frames during which eight different users share the channel. A GSM time slot is only 577 $\mu$s (microseconds), and each users gets to use the channel for 577 $\mu$s every 4.615 ms (milliseconds). 577 $\mu$s*8=4.615 ms. Transmission is achieved in bursts.

C. Mobile Station Architecture.

As shown in FIG. 2, mobile stations generally comprise two basic parts, the RF (radio frequency) part 20 and the digital part (or baseband processing circuitry) 21. The RF part operates receiving, transmitting, and modulation functions. The digital part handles data processing, control, and signaling functions. As shown, the radio frequency part includes an antenna 27 for receiving and transmitting radio signals. A radio signal received by the radio frequency part is converted to a lower frequency signal and delivered 22 to the digital part. Likewise, a signal generated by the digital part is delivered 23 to the radio frequency part, which in turn converts the signal to a higher frequency signal, and transmits that higher frequency signal.

The digital part is operatively connected to a handset 24, which has a speaker 25 and a mouthpiece 26. All or part of the radio frequency part and the digital part can be disposed within the handset, as is the case with cell phones.

Receiving Architecture. As shown in FIG. 3, a mobile station comprises an antenna 50 for transmitting and receiving radio signals. In FIG. 3, the antenna is coupled to both receiving 51 and transmitting 52 paths. The receiving path is connected to a receiver 53. The receiver contains a receiving filter network and a mixer to convert the input signal into an intermediate (lower) frequency. The down-converted signal is converted into a digital signal by an analog-to-digital converter 54. An equalizer adjusts for distortions 55. A demodulator 56 extracts the bit stream from the intermediate frequency, and a demultiplexer 57 sorts the information from the different time slots and frames into their appropriate individual logical channels.

It should be noted that while a GSM mobile station comprises an equalizer, there exist other types of mobile stations that do not have an equalizer function, such as CDMA mobile stations. As would be recognized by someone skilled in the relevant art, some of the other details described herein are GSM specific and may be different in another wireless communications system. This fact should not be read to limit the present invention only to GSM applications.

The channel codec 58 decodes the bit sequence coming from the demultiplexer. The channel codec passes a signaling frame to the control processor 59 and passes a speech frame to a speech codec 60.

The speech codec rebuilds sounds out of 260-bit speech blocks received from the channel codec and passes the digitized speech to the digital-to-analog converter 61. The analog signal is converted to sound by an ear piece 62 of the phone or handset 63. The control processor performs the control functions of the mobile station, including, for example, power control and the selection of different channels.

Also included in the mobile station architecture is a reference clock, which is used to drive the digital hardware. In a GSM system, the reference clock is required to run at 13 MHz within 0.1 ppm while the mobile station is in active use. Clock circuitry may also include tuning circuitry or temperature compensation circuitry to make the reference signal more accurate. For purposes of interpreting the claims herein, "clock" should be interpreted to include such circuitry where the function of the circuitry is to increase the accuracy of the signal with respect to the desired frequency.

Transmitting Architecture. Voice is received via the mouthpiece 70 of the phone and converted to an electrical analog signal. The analog signal is then converted to a digital signal by an analog-to-digital converter. The speech codec compresses the digitized speech coming from the analog-to-digital converter 71 such that the data are represented by 260 bit blocks before being encoded. The channel codec encodes each bit sequence before going to a multiplexer. The burst-building unit 72 places the coded bits in the transmitter path into the appropriate burst structure. The multiplexer 73 assigns each burst to a time slot within a numbered frame in which it should be transmitted. After this sorting and ordering has been done, the modulator 74 imparts this information on the intermediate frequency carrier.

The digitized signal passes through a digital-to-analog converter 75 and the transmitter 76 up-converts the modulated intermediate frequency signals from the modulator to the final radio frequency in the 900-MHz band. The signal is transmitted via the antenna.

The hardware for converting analog signals to digital signals, and visa versa, (i.e., FIG. 3, items 54, 61, 71 and 75) may be called "mixed signal." Also, the equalizer, demodulator, demultiplexer, channel codec, speech codec, burst building unit, multiplexer and modulator functions described above (i.e., FIG. 3, items 55, 56, 57, 58, 60, 72, 73 and 74) can be handled by (in whole or in part) a digital signal processor ("DSP"). The operation of the DSP can he made more efficient with appropriate hardware accelerators. The RF part in FIG. 3 comprises items 51, 52, 53 and 76.

A block diagram of a mobile station design with a DSP is shown in FIG. 4. Shown in FIG. 4 is the microphone 100 and speaker 101, which are operationally connected to the mixed signal 102. The radio frequency circuitry 103 is also operationally connected to the mixed signal. There is also interface logic 104 which interfaces with the radio frequency circuitry, and the mixed signal. Further, the interface logic interfaces with the mobile station keypad 105, the mobile station display 106, a subscriber identity module (SIM) card (which provides the mobile station with identifying information) 107, a serial port 108, and a battery 109. The control processor 110 and control processor program/data memory 11 also interface with the interface logic, as do the DSP 112 and the DSP program/data memory 113. Also shown are DSP accelerators 114, including a Gaussian minimum-shift keying (the modulation scheme for GSM) accelerator and an equalizer accelerator.

D. Sleep Circuitry.

One significant challenge facing designers of mobile stations is conserving power. Because mobile stations are generally powered by batteries, mobile stations which consume available power quickly have a significant disadvantage. One manner in which power can be conserved is to introduce sleep circuitry into the mobile station. With sleep circuitry, when the mobile station is in idle mode (i.e., listening to a paging channel periodically, but otherwise taking no action), the control processor commands the mobile station to enter into a sleep mode to minimize power consumption. During sleep mode, the processors (ie., the control processor and the DSP) are shut down, thereby conserving energy.

A problem with current sleep mode circuitry is that, while the mobile station is in sleep mode, the 13 MHz clock is still in operation. Because of the high frequency of the reference clock, significant power is consumed even during sleep mode.

SUMMARY OF THE INVENTION

According to the present invention, when the mobile station of a wireless communications system is in idle mode (i.e., listening to a paging channel periodically, but otherwise taking no action), the control processor commands the mobile station to enter into sleep mode to minimize power consumption. During sleep mode, the high-frequency reference clock and thus all high-frequency clocks derived from it are turned off. Only a low-frequency clock remains operating at all times to clock the sleep logic.

DESCRIPTION OF THE PREFERRED EMBODIMENTS

According to the present invention, when the mobile station is in idle mode (i.e., listening to a paging channel periodically, but otherwise taking no action), the control processor commands the mobile station to enter into sleep mode to minimize power consumption. During sleep mode, the 13 MHz reference clock and thus all high frequency clocks derived from it are turned off. Only a 32 kHz clock remains operating at all times to clock the sleep logic.

A. Clocking Scheme.

Figure 1:
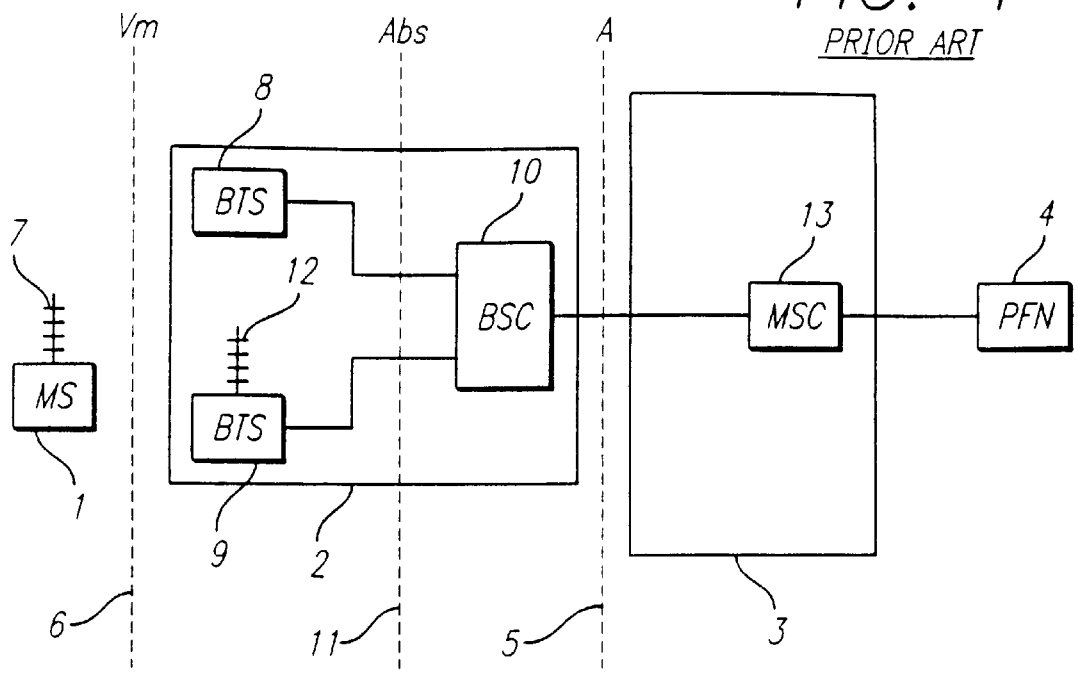
FIG. 1 is a block diagram of a wireless communications system.
Figure 2:
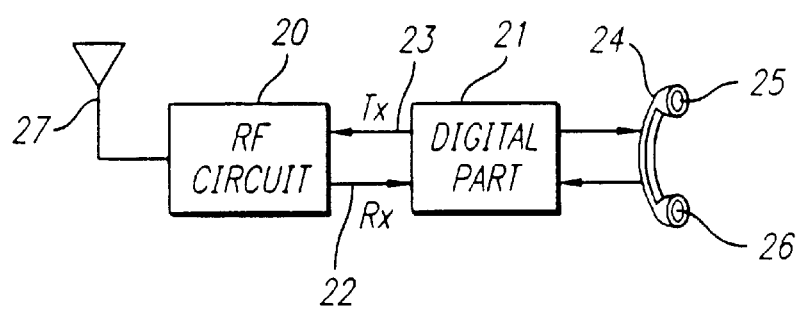
FIG. 2 is a block diagram of the basic architecture of a mobile station.
Figure 3:
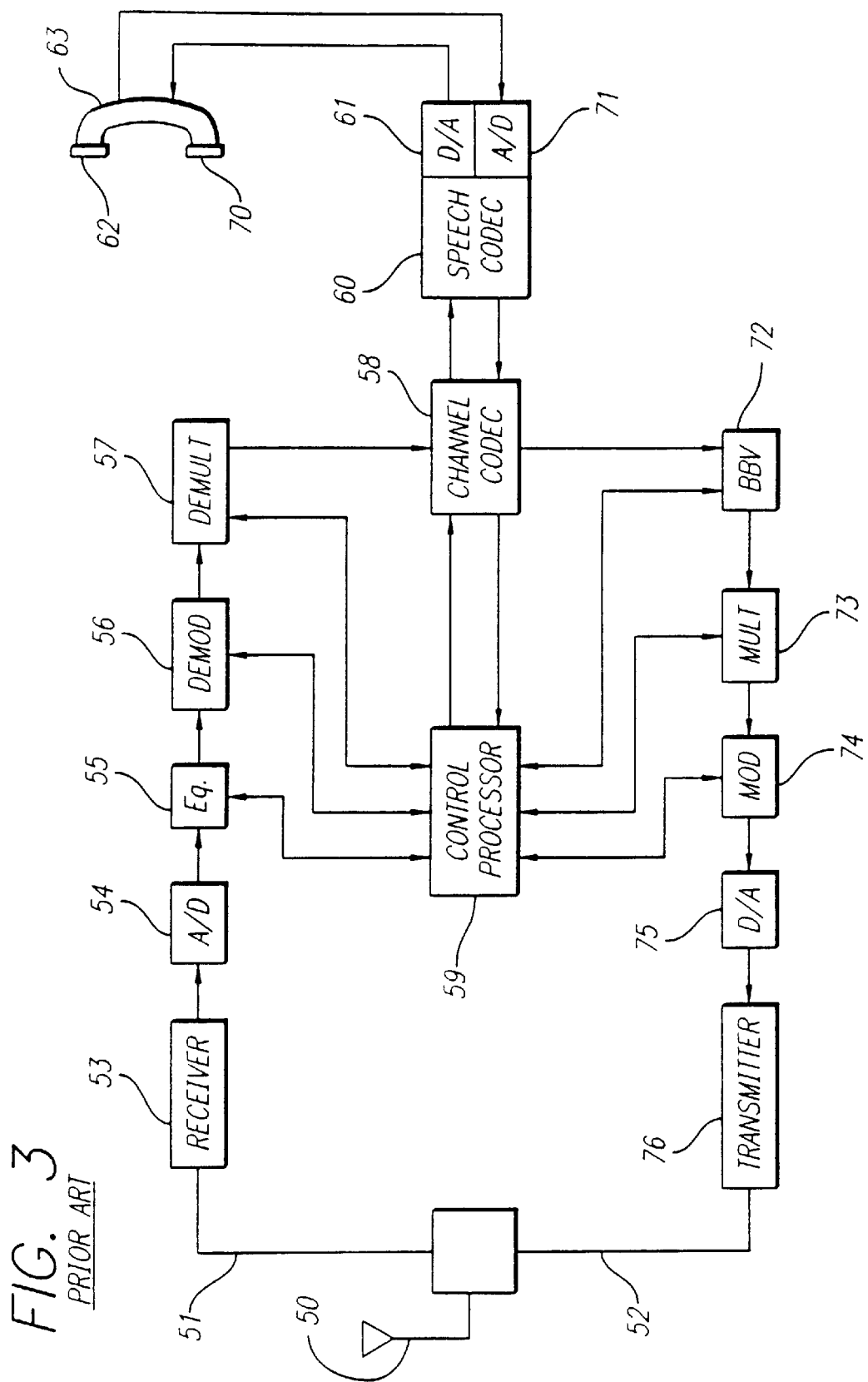
FIG. 3 is a block diagram of the architecture of a mobile station.
Figure 4:
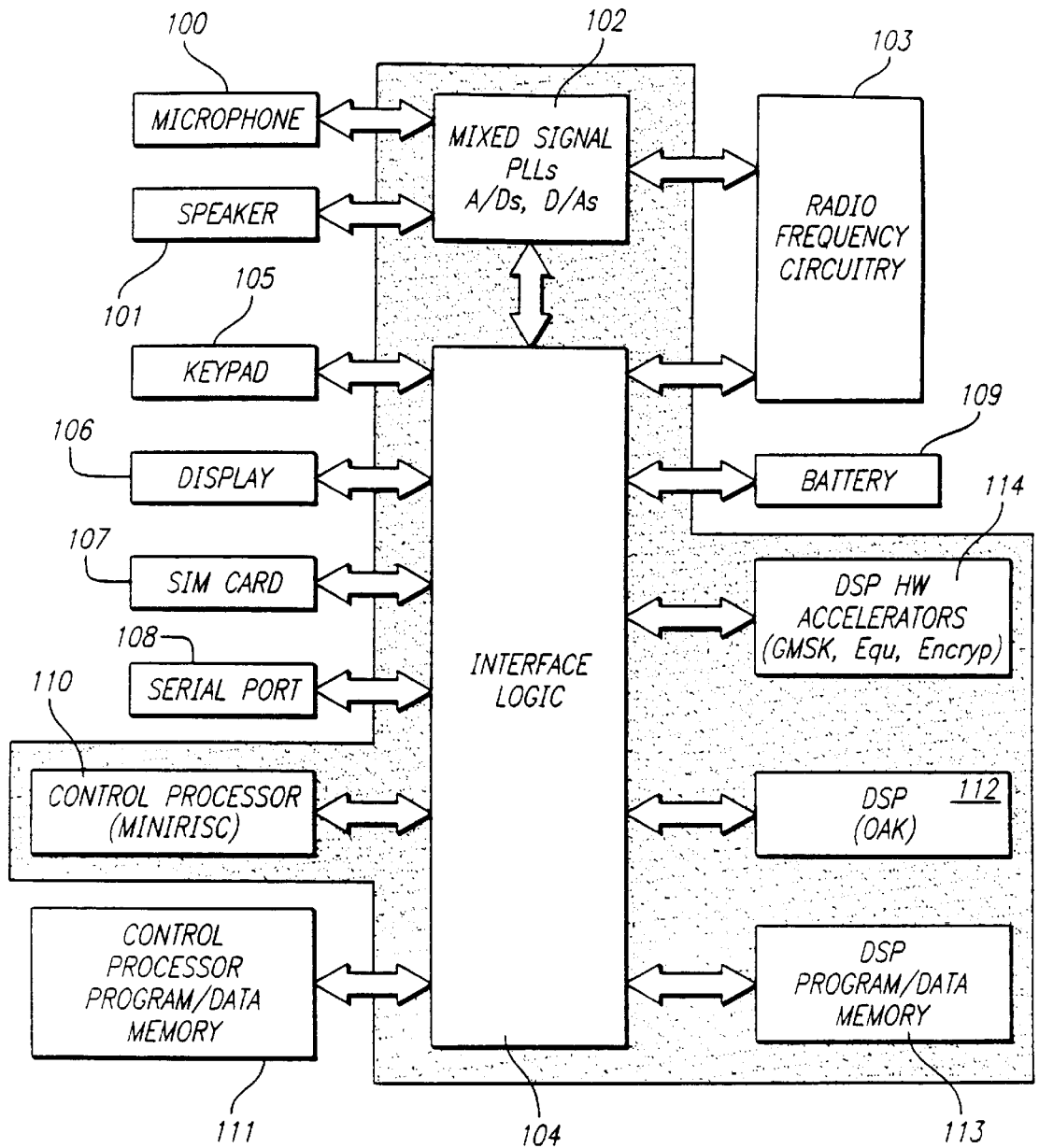
FIG. 4 is a block diagram of the architecture of a mobile station including a digital signal processor.
Figure 5:
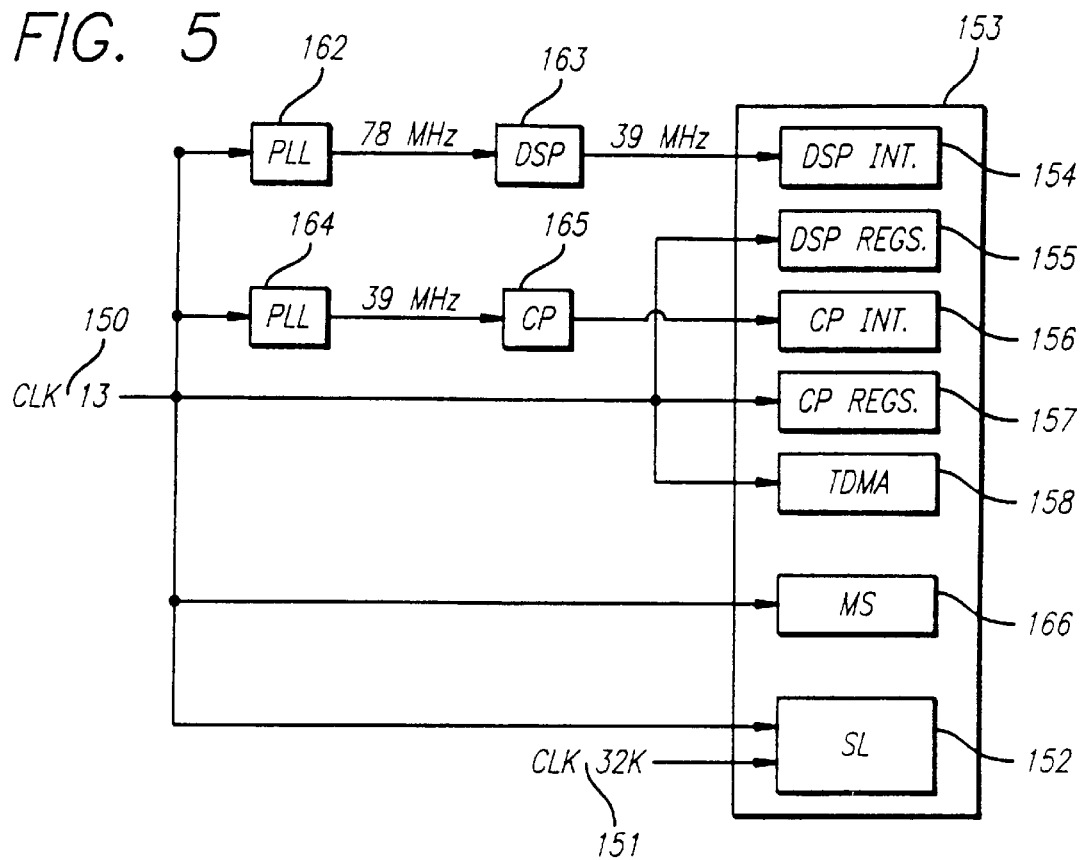
FIG. 5 is a schematic of the clocking scheme of the mobile station.

FIG. 5 shows a clocking scheme of the present invention. The reference clock 150 is set at 13 MHz. There is also a 32 kHz clock 151. Both clocks are input into the sleep logic 152. In the clocking scheme layout, there is hardware 153 which includes the DSP interface 154, the DSP registers 155, the control processor interface 156, the control processor registers 157, the TDMA timer 158 (which keeps time for the system in TDMA frames), and the sleep logic. When the mobile station is not in sleep mode, the 13 MHz clock serves as a reference directly for the DSP registers, the control processor registers, the TDMA timer, and the sleep logic, as well as the RF circuitry. A first phase lock loop 162 up-converts the 13 MHz signal as a reference for the DSP 163, while a second phase lock loop 164 up-converts the 13 MHz signal as a reference for the control processor 165. The 13 MHz signal also acts as a reference for the mixed signal 166.

The sleep logic operates such that when the mobile station enters sleep mode, the 13 MHz clock is shutdown. The circuitry for which it provides a reference is also shutdown, except the sleep logic circuitry. During sleep mode the sleep logic circuitry continues to operate with the 32 kHz clock as a reference.

B. Operation of Sleep Logic Circuitry.

In a GSM system, the 13 MHz clock is synchronized to the base station, providing a high accuracy reference. The frequency may be tuned by a digital-to-analog converter driving an external tuning circuit. During sleep mode, the digital-to-analog converter and the 13 MHz oscillator are powered down, leaving only a free running 32 kHz clock. Because the power-up time needs to be fairly accurate, the 32 kHz clock is calibrated to the 13 MHz clock while both are powered on, allowing the control processor to convert the sleep time in TDMA frames to the sleep time in 32 kHz cycles.

1. Calibration.

Although it can he expected that the 13 MHz clock and the 32 kHz clock will be generally accurate, it is possible that the clocks will provide only approximate frequency values. In the GSM system, however, it should be noted that the 13 MHz clock will generally be tuned to an accuracy of 0.1 ppm. The 32 kHz clock may vary between 31 kHz to 33 kHz as a result of temperature changes, inaccuracies in the clock crystal, etc. Assuming the 32 kHz clock is otherwise accurate, frequency changes due to temperature variance are generally within plus or minus 50 ppm. The frequency of a clock designated as a "32 kHz clock" may actually only approximate 32 kHz. Therefore, the present invention provides for a method and apparatus for calibrating the clocks before sleep mode.

Figure 6:
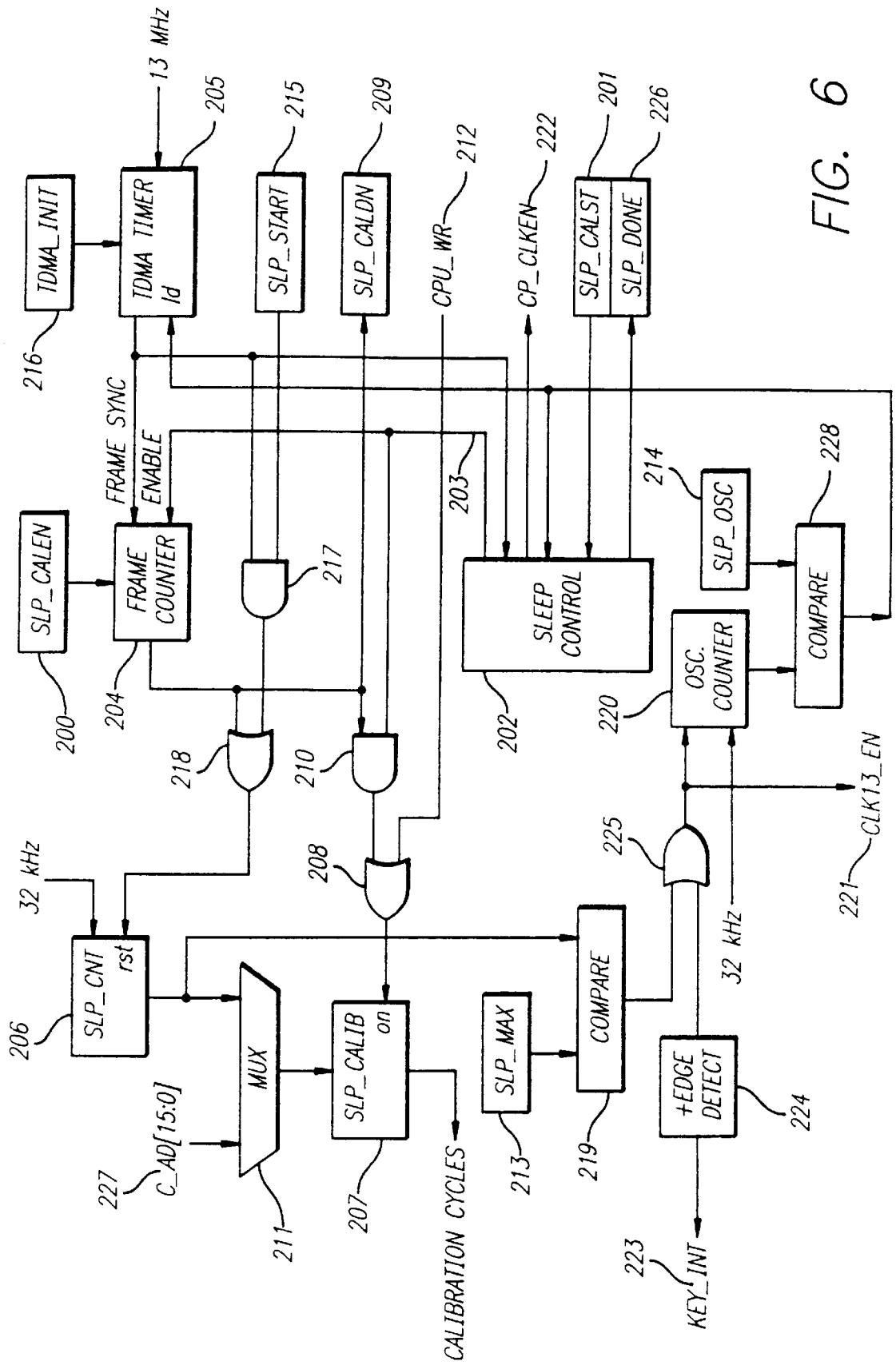
FIG. 6 is a schematic of the sleep logic.

As shown by FIG. 6, a value SLP_CALEN is input by the control processor into a calibration length register 200. The value SLP_CALEN represents the amount of time over which the sleep logic should calibrate the 32 kHz clock. The value is in units of a TDMA frame. During non-sleep mode, the control processor programs the calibration length register with the value SLP_CALEN (i.e., the number of TDMA frames, T, over which to count 32 kHz cycles). T will generally be the number of TDMA frames in the current paging period.

The sleep hardware remains idle until the control processor writes a 1 to the calibration start register (SLP_CALST) 201, which starts the calibration procedure. The value of SLP_CALST is input into the sleep control 202, which has a connection 203 to the enable switch of a frame counter 204. Thus, when the value of SLP_CALST is 1, the sleep control enables the frame counter via the connection, which begins the operation of the frame counter. The frame counter will then proceed to count the TDMA frames input from the TDMA timer 205 until the frame count reaches the value SLP_CALEN, as previously input by the control processor.

The sleep hardware calibrates the 32 kHz clock by counting the number of 32 kHz cycles within the T TDMA frames. The sleep counter (also called herein the "32 kHz counter") 206 counts the cycles of the 32 kHz clock, with the number of cycles represented by the value SLP_CNT. The sleep counter is set to zero before the calibration process begins by the frame counter via an OR gate 218.

When calibration is complete, the frame counter enables a calibration register (SLP_CALIB) 207 via an AND gate 210 and an OR gate 208. The frame counter also sets a bit in the calibration done register (SLP_CALDN) 209. When the calibration register is so enabled, it latches on to the value of SLP_CNT via a multiplexer. The sleep counter is also reset to zero.

The control processor can alternatively write in a value for SLP_CALIB by enabling the calibration register by issuing an instruction CPU_WR 212 via OR gate 208. In such a case, the control processor inputs the appropriate value 227 via the multiplexer 211. The control processor can exercise this option if, upon wake up, the paging pulse (which in GSM generally consists of four bursts) is not where it is expected due to drift of the 32 kHz clock during sleep mode.

The control processor polls the calibration done register (SLP_CALDN) and if it reads a 1, the control processor will write in a 0 to clear the calibration done register and the hardware will repeat calibration starting at the following TDMA frame boundary, resulting in a latent period of about 1 TDMA frame between successive calibraition periods.

2. Preparation for Sleep Mode.

Before sleep mode, the control processor needs to determine how long the control processor should sleep before it wakes up. Typically, a sleep time will be slightly less than the length of the paging channel. In preparation for sleep mode, the control processor converts the time between the start of the next TDMA frame (when sleep mode will begin) and the end of sleep mode into 32 kHz cycles, using the readable T period 32 kHz cycle count in the calibration register (SLP_CALIB). The control processor then writes the desired number of 32 kHz cycles to sleep into the sleep duration register (SLP_MAX) 213.

The control processor programs the oscillation settling period register (SLP_OSC) 214 with the number of 32 kHz cycles needed between powering up of the 13 MHz clock and its settling to the right frequency. The sleep control further disables the frame counter. Finally, the control processor writes a "1" into a sleep mode start register (SLP_START) 215 to signal the start of sleep mode. This will occur after calibration is complete (i.e., the value of SLP_CALDN is 1). Sleep mode will then be triggered at the beginning of the next TDMA frame. Before entering sleep, the control processor will program the TDMA initial value register (TDMA_INIT) 216 with the value to be loaded into the TDMA timer when sleep mode is ended.

3. Entering Sleep Mode.

Upon entering sleep mode, the 32 kHz counter (SLP_CNT) resets to "0" (by the sleep mode register via an AND 217 and an OR gate 218) and is reused for timing the sleep duration. During sleep mode, therefore, the value SLP_CNT represents the duration of sleep mode in 32 kHz cycles. Comparator hardware 219 compares the 32 kHz counter to the maximum sleep time (SLP_MAX). If the 32 kHz counter matches the programmed sleep time, sleep mode is complete and the oscillation counter 220 is enabled as is the 13 MHz clock 221. When sleep mode is complete, the 32 kHz counter (SLP_CNT) is disabled so that it can be read by the control processor for computing the overall sleep mode duration.

4. End of Sleep Mode.

At the end of sleep, the 13 MHz clock circuitry and the TDMA timer are powered up. It takes some amount of time for this circuitry to settle at the correct frequency. The value SLP_OSC represents the amount of time the 13 MHz oscillator requires to settle after being enabled by the hardware. The hardware times out SLP_OSC+1 32 kHz cycles during the oscillation period. As discussed above, this settling time, in 32 kHz cycles, is programmed into the oscillator settling period register (SLP_OSC) 214 prior to entering sleep mode. When sleep mode ends, hardware enables the 13 MHz oscillator, and the oscillator settling counter 220 resets and counts until the settling period has expired. This occurs because the oscillation settling counter value and the value in the oscillation counter are compared 228 and when the oscillation counter reaches SLP_OSC, the comparison logic signals the sleep control and initiates the TDMA timer.

At the end of the oscillator settling period, the TDMA timer is loaded with the value in the TDMA initial value register (TDMA_INIT) 216 which the control processor programs prior to sleep mode. In addition, hardware enables the control processor clock by asserting CP_CLKEN 222, and asserts a 1 in a sleep done register 226.

After the initial TDMA timer value is loaded, the 13 MHz clock, the TDMA timer circuitry, and the control processor are all active. The control processor can then wake up any other circuitry as required and proceed as normal. The control processor will also need to update internal counters as appropriate.

5. Wake-Up Due To Keypad Press.

The sleep circuitry behaves in the same manner as if a wake up occurs due to a keypad press. The sleep mode hardware receives an active high signal (KEY_INT) 223 indicating whether any keypad key is being pressed. The sleep hardware detects the positive going edge 224 and sets a flag which remains set until the 13 MHz clock has been enabled. Both the keypad press and signal from the comparator 219 are input into an OR gate 215. The control processor will be interrupted with a keypad interrupt and will be aware that this mode of wake up occurred. The TDMA timer will have been loaded with the desired initialization value for a normal sleep mode wake up, which will be the incorrect value for the asynchronous keypad wake up. However, the control processor can read the actual sleep time from hardware registers, can compute the actual amount of time spent sleeping, and can reprogram the sleep timers appropriately to return to sleep (or just reprogram the TDMA timer if the keypad press occurred immediately before the desired end of sleep).

These and other aspects, features, and advantages of the present invention will be apparent to those persons having ordinary skilled in the art to which the present invention relates from the foregoing description and the accompanying drawings.

Although the present invention has been described in detail with regarding the exemplary embodiments and drawings thereof, it should be apparent to those skilled in the art that various adaptations and modifications of the present invention may be accomplished without departing from the spirit and the scope of the invention. Accordingly, the invention is not limited to the precise embodiment shown in the drawings and described in detail hereinabove. Therefore, it is intended that all such variations not departing from the spirit of the invention be considered as within the scope thereof as limited solely by the claims appended hereto.

In the following claims, those elements which do not include the words "means for" are intended not to be interpreted under 35 U.S.C. § 112 ¶ 6.

What is claimed is:

1. A wireless communications mobile station comprising:
   a. radio frequency circuitry for receiving and modulating radio signals;
   b. first mixed signal circuitry operationally connected to the radio frequency circuitry for converting the modulated radio signals to digitized signals;
   c. baseband processing circuitry operationally connected to said first mixed signal circuitry for processing said digitized signals, wherein said baseband processing circuitry comprises a control processor and a digital signal processor and wherein the control processor is operationally connected to the first clock via a phase lock loop which up-converts the frequency of the reference signal from the first clock;
   d. second mixed signal circuitry operationally connected to the baseband processing circuitry for converting processed digitized signals to analog signals;
   e. a speaker operationally connected to said second mixed signal circuitry for communicating speech derived from analog signals input into the speaker from said second mixed signal circuitry;
   f. a first reference clock operationally connected to said baseband processing circuitry which provides an approximate 13 MHz reference signal;
   g. a second clock which runs at a frequency lower than 13 Mhz; and
   h. sleep logic circuitry operationally connected to said first clock and said second clock, such that said sleep logic circuitry causes the mobile station to enter a sleep mode in which said first clock is turned off and the second clock serves as a timing reference for the sleep logic circuitry.

2. A wireless communications mobile station comprising:
   a. radio frequency circuitry for receiving and modulating radio signals;
   b. first mixed signal circuitry operationally connected to the radio frequency circuitry for converting the modulated radio signals to digitized signals;
   c. baseband processing circuitry operationally connected to said first mixed signal circuitry for processing said digitized signals, wherein said baseband processing circuitry comprises a control processor and a digital signal processor and wherein the digital signal processor is operationally connected to the first clock via a phase lock loop which up-converts the frequency of the reference signal from the first clock;
   d. second mixed signal circuitry operationally connected to the baseband processing circuitry for converting processed digitized signals to analog signals;
   e. a speaker operationally connected to said second mixed signal circuitry for communicating speech derived from analog signals input into the speaker from said second mixed signal circuitry;
   f. a first reference clock operationally connected to said baseband processing circuitry which provides an approximate 13 MHz reference signal;
   g. a second clock which runs at a frequency lower than 13 Mhz; and h. sleep logic circuitry operationally connected to said first clock and said second clock, such that said sleep logic circuitry causes the mobile station to enter a sleep mode in which said first clock is turned off and the second clock serves as a timing reference for the sleep logic circuitry.

3. Digital circuitry for a wireless communications mobile station comprising:

a. baseband processing circuitry for processing digitized radio signals, said baseband processing circuitry comprises a control processor and a digital signal processor wherein the control processor is operationally connected to the first clock via a phase lock loop which up-converts the frequency of the reference signal from the first clock;

b. a first reference clock operationally connected to said baseband processing circuitry and providing an approximate 13 MHz reference signal, c. a second clock which runs at a frequency lower than 13 MHz; and d. sleep logic circuitry operationally connected to said first clock and said second clock, such that said sleep logic circuitry causes the mobile station to enter a mode in which said first clock is shut down and the second clock serves as a timing reference for the sleep logic circuitry.

4. Digital circuitry for a wireless communications mobile station comprising:

a. baseband processing circuitry for processing digitized radio signals, said baseband processing circuitry comprises a control processor and a digital signal processor wherein the digital signal processor is operationally connected to the first clock via a phase lock loop which up-converts the frequency of the reference signal from the first clock;

b. a first reference clock operationally connected to said baseband processing circuitry and providing an approximate 13 MHz reference signal;

c. a second clock which runs at a frequency lower than 13 MHz; and d. sleep logic circuitry operationally connected to said first clock and said second clock, such that said sleep logic circuitry causes the mobile station to enter a mode in which said first clock is shut down and the second clock serves as a timing reference for the sleep logic circuitry.

5. A wireless communications system comprising:

a. a mobile station, b. a base station subsystem which controls the radio link with the mobile station, and c. a network subsystem which is interfaced with a public fixed network and the base station subsystem, wherein said mobile station comprises the following:

i. radio frequency circuitry for receiving and modulating radio signals;

ii. first mixed signal circuitry operationally connected to the radio frequency circuitry for converting the modulated radio signals to digitized signals;

iii. baseband processing circuitry operationally connected to said first mixed signal circuitry for processing said digitized signals;

iv. second mixed signal circuitry operationally connected to the baseband processing circuitry for converting processed digitized signals to analog signals, v. a speaker operationally connected to said second mixed signal circuitry for communicating speech derived from analog signals input into the speaker from said second mixed signal circuitry;

vi. a first reference clock operationally connected to said baseband processing circuitry providing a first reference signal;

vii. a second clock which runs at a freguency lower than the frequency of the first clock wherein said second clock runs between 32 kHz minus 50 ppm and 32 kHz plus 50 ppm; and viii. sleep logic circuitry operationally connected to said first clock and said second clock, such that said sleep logic circuitry causes the mobile station to enter a sleep mode in which said first clock is turned off and the second clock serves as a timing reference for the sleep logic circuitry, ix. a calibrator to calibrate the signal of the second clock prior to sleep mode.

\* \* \* \* \*